Dec. 11, 1962  A. L. GENTER ETAL  3,067,878
METHOD AND APPARATUS FOR SETTLING SOLIDS FROM LIQUIDS
Filed July 7, 1959  3 Sheets-Sheet 1

INVENTORS
ALBERT L. GENTER
RICHARD R. KENNEDY
ROBERT M. KENNEDY

BY Cushman, Darby & Cushman
ATTORNEYS

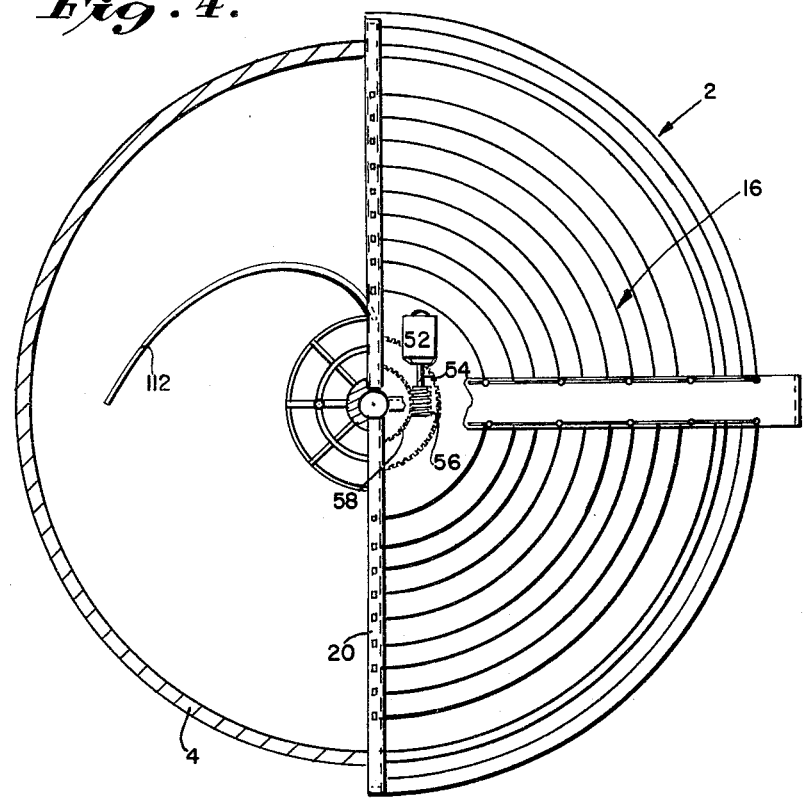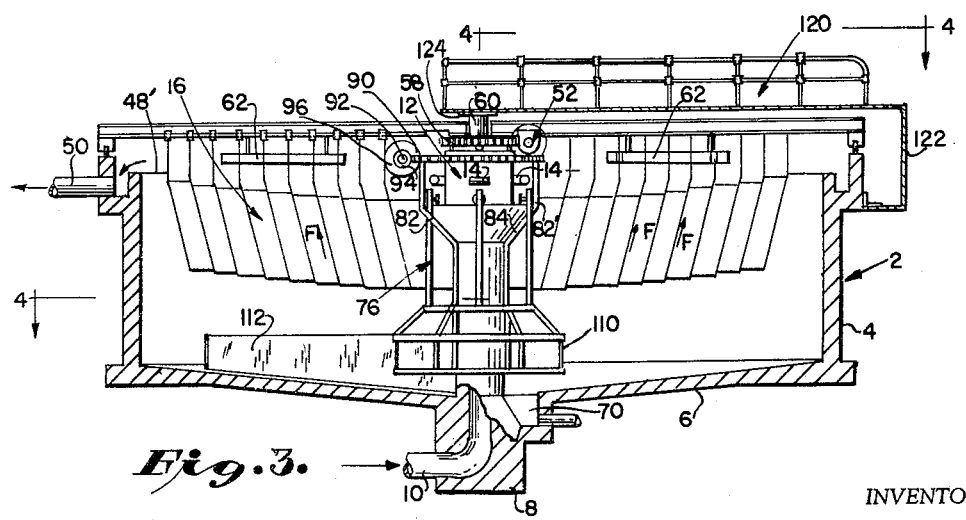

INVENTORS
ALBERT L. GENTER
RICHARD R. KENNEDY
ROBERT M. KENNEDY

BY *Cushman, Darby & Cushman*
ATTORNEYS

United States Patent Office 3,067,878
Patented Dec. 11, 1962

3,067,878
METHOD AND APPARATUS FOR SETTLING SOLIDS FROM LIQUIDS
Albert L. Genter, Wyman Park Apts., Baltimore 11, Md., and Richard R. Kennedy and Robert M. Kennedy, both of 604 Mission St., San Francisco, Calif.
Filed July 7, 1959, Ser. No. 825,442
17 Claims.  (Cl. 210—83)

This invention relates to a method of, and apparatus for, separating dispersed solids from a carrier liquid. The apparatus of this invention finds particular utility when operated as a settling tank for the treatment of mixtures of solids suspended in liquids, and the method of this invention is particularly concerned with the manner in which the solids content of such mixtures is separated from the liquid content by sedimentation and decantation of clear supernatant liquid.

The term carrier liquids as used herein refers to all mechanical mixtures of liquids and solids. The solids content of a carrier liquid consists of dispersed particles which are hereinafter referred to as "particles to be settled." Once such particles have been deposited on a surface within a settling tank they are referred to as "settled particles." Similarly, the surfaces on which the settled particles have been deposited are referred to as "settling surfaces." In any settling tank the carrier liquid enters the tank at a certain rate known to those in the art as the "influent rate" and leaves the tank as a clear or clearer liquid at a certain rate known as the "overflow rate."

Settling tanks which have heretofore been utilized for the separation of solids suspended in various liquids have taken various forms. The most widely used have been rectangular or elongated in shape and/or have contained multiple circular trays. It is well known that the factors which control the settling movement of a suspended solid through any liquid resisting medium are the size and specific gravity of the particle and density and viscosity of the liquid medium and the distance the settling particle must travel before finding a lodging place. Furthermore, practice has taught that the time required for suspended solids to settle out of a carrying liqiud before finding a lodging place must be short. This fact led to inventing super-imposed trays which are inherently more expensive and inaccessible for cleaning purposes.

It has been found that the settling of solids through fluids takes place in most every settling tank in three successive stages. The first stage starts with the dispersed settleable solids suspended near the upper surface of the tank contents. In such tanks we always attempt to hold the mixture of suspended solids and liquid relatively quiescent and allow gravity to pull the settleable solids down through the liquid. In the upper mixture layer the solids are in the free settling zone. Below this zone is the transition zone where the settling solids are no longer free to stagger downward at the various constant rates determined by their size, shape and density and the law governing free falling bodies. In this transition zone the falling particles start crowding each other and the settling rate decreases. An impeded settling zone then follows, where both settling and a crude form of upward liquid filtration occur. As the consolidating solid aggregate settles farther they displace liquid upward through the existing void channels between the particles thereby materially diminishing the void volume. The solids and liquid move in opposing directions with the liquid containing some fine suspended solids, doing the staggering upward. The law of capillary flow in the diminishing voids now opposes the pull of gravity. When, during the allowed detention period, the void volume has diminished to the extent where the flow throttling action of the void channels equals the effect of the pull of gravity, gravity can do no more for us in plain sedimentation. Our present invention aims to hasten the free settling rate, help eliminate the transition period and increase the hindered settling zone which means increasing the overall efficiency of a gravity thickener.

This invention has as one of its primary objects the provision of a circular settling tank in which high overflow rates can be maintained and bacterial action can be controlled. More particularly, it is a primary object of this invention to provide a settling tank in which the rate of settling of dispersed particles contained in a carrier liquid is increased over settling rates obtainable with prior art devices.

Since the distance which a particle must travel from its position in a carrier liquid to a surface on which it is deposited varies in direct proportion to the overflow rate of clear liquid from a settling tank, the overflow rate can be increased by decreasing the distance a particle must travel to settle. Accordingly, this invention has as another of its primary objects, the provision of a settling tank wherein the average distance particles dispersed in the carrier liquid must travel to a settling surface is decreased over any such distances which are existent in settling tanks heretofore designed.

In addition to the foregoing factors, the less turbulent and shallower the flow of carrier liquid, the faster the dispersed particles settle. Thus, still another primary object of this invention is to provide a circular settling tank in which (a) means are incorporated to distribute incoming sewage whereby it assumes a shallow laminar non-turbulent flow, (b) baffle plate(s) are provided to increase the settling surface area, and (c) means are provided to cause movement of the baffle surfaces toward particles to be settled.

Although the factors considered above are of utmost importance, the depth of settled particles collected on the settled surfaces at any time cannot be neglected. The thicker the layer of collected material on the settling surfaces, or the more prevalent the accumulations of sludge on those surfaces, the less efficient the settling tank becomes, because there will necessarily be more fluid trapped between solids layers. Accordingly, another primary object of this invention is to provide a settling tank having means therein to agitate the settling surfaces to prevent accumulations thereon, and to hasten the travel of settled particles down the settling surface to an outlet chamber.

Although the general primary objects of the invention have been set forth above, specific objects of this invention are important. One of the specific objects of this invention is to provide a settling tank having an inlet means which comprises a series of T-shape fluid distributors so disposed as to cause the velocity of incoming liquid to be reduced substantially by the counter action of adjacent incoming streams, and another specific object of this invention is to provide a circular settling tank having the above described features and in addition a movable settling surface which travels toward particles to be settled.

Still other specific objects of this invention are: (1) to provide a circular settling tank having a rotatable spiral baffle structure therein; (2) to provide such a settling tank with means for vibrating the baffle structure; (3) to provide such a settling tank wherein the top of the baffle surface(s) are closer to the liquid level within the tank the closer such surfaces are to the circumference of the tank; (4) to provide such a settling tank wherein incoming unsettled mixtures of solids and liquid are distributed from a central influent well through a series of distributors substantially in alignment with the top of the adjacent baffle surface(s); (5) to provide such a settling tank incorporating a rotating structure in the bottom thereof for continuously causing material dropping off the settling surfaces to travel into an outlet chamber or well; (6) to provide such a settling tank incorporating a spiral shaped sweeper for continuously gathering material which has dropped off of the settling surfaces into a central outlet chamber; (7) to provide such a settling tank wherein means are provided above the liquid level for revolving the baffle structure, for vibrating the baffle structure, and for driving the means causing settling particles to travel to the outlet chamber.

Still a further specific object of this invention is to provide a settling tank having a revolvable spiral baffle therein which has either (a) a wavy surface or (b) a series of protrusions on its surface to increase its effective settling area.

As suggested at the outset of this application, the invention is concerned with a method of settling dispersed particles in a carrier liquid from the carrier. Basically, the invention provides for feeding a mixture composed of dispersed particles in a carrier liquid into a circular settling tank, directing the carrier into separate streams entering the tank centrally in opposing relation whereby the carrier begins travel through the tank as a non-turbulent laminar flow, allowing the carrier to flow through the tank at a rate which permits the dispersed particles therein to settle therefrom, intercepting the particles as they settle from said carrier liquid on settling surfaces, agitating the settling surfaces to hasten movement of settled particles toward the bottom of the tank, and conveying settled particles to a single outlet location.

As should be apparent from the above general discussion of the objects of the invention, the apparatus provided by this invention basically comprises a circular tank, a distribution well centrally disposed within the tank, inlet distributors communicating with the distribution well for directing incoming carrier liquid into opposing streams, a rotatable spiral baffle structure within said tank, means to vibrate said baffle structure when and if necessary and conveying means under said baffle structure for conveying settled particles to an outlet chamber. The overall structure is a feature of this invention, however, it should be understood that some of the coacting components of the overall structure are in and of themselves features of this invention.

The invention will be better understood, and objects other than those specifically set forth above will become apparent when consideration is given to the following detailed description of the invention, wherein:

FIGURE 3 is a cross-sectional view of an improved settling tank and is similar to FIGURE 2, however, FIGURE 3 shows a modified form of baffle structure and a modified form of tank cleaning scraper.

FIGURE 4 is a plan view, partially broken away, of the settling tank shown in FIGURE 3; FIGURE 4, having been taken on line 4—4 of FIGURE 3.

Figure 2:
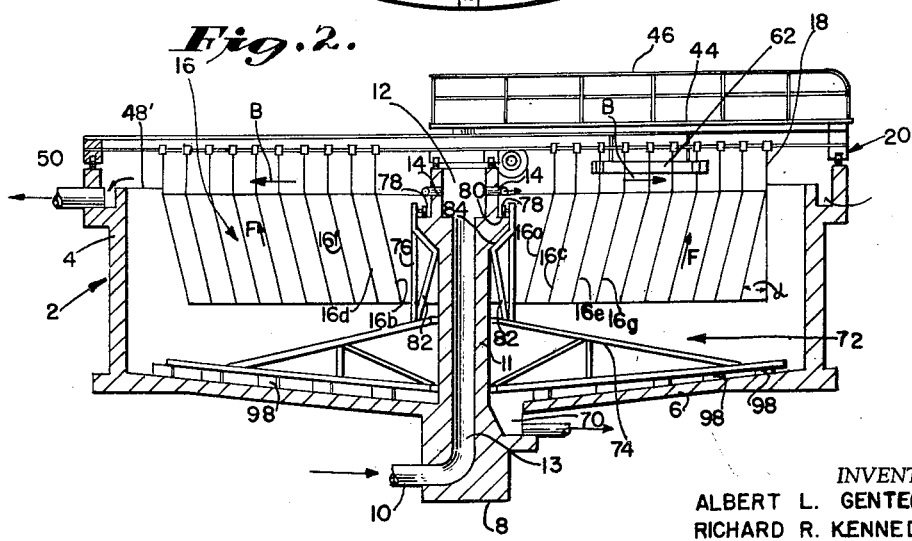
FIGURE 2 is a cross-sectional view of the tank shown in FIGURE 1, FIGURE 2 having been taken on line 2—2 of FIGURE 1.

In the drawings, like numerals have been used to refer to like components. The numeral 2 designates generally a circular settling tank having a ring-shaped side wall 4 and a conical bottom wall 6. As shown in FIGURE 2, an extension 8 projects from the bottom of the tank, and through this extension passes a fluid inlet conduit 10. Fluid entering the tank through conduit 10 passes into an inlet distribution well 12 located at the top of a central column 11. As is apparent, inlet conduit 10 communicates with the distribution well 12 via bore 13 in column 11.

Also communicating with the distribution well 12 are a series of T-shape fluid distributors 14. The distributors 14 are disposed in horizontal alignment with their outlet heads in a circle so that streams of fluids exiting from adjacent heads oppose one another.

For example, the stream of unsettled mixture leaving end X of distributor 14 (shown in FIGURE 1) directly meets the stream leaving end Y of distributor 14(a). The two streams inlet velocities are in direct opposition and as a result, the inlet velocity of one stream cancels the inlet velocity of the other stream so that the liquid introduced into the tank through the adjacent ends of the successive conduits has substantially no inlet velocity. Because of this, the liquid assumes a substantially non-turbulent sheet or laminar flow through the tank.

Figure 1:
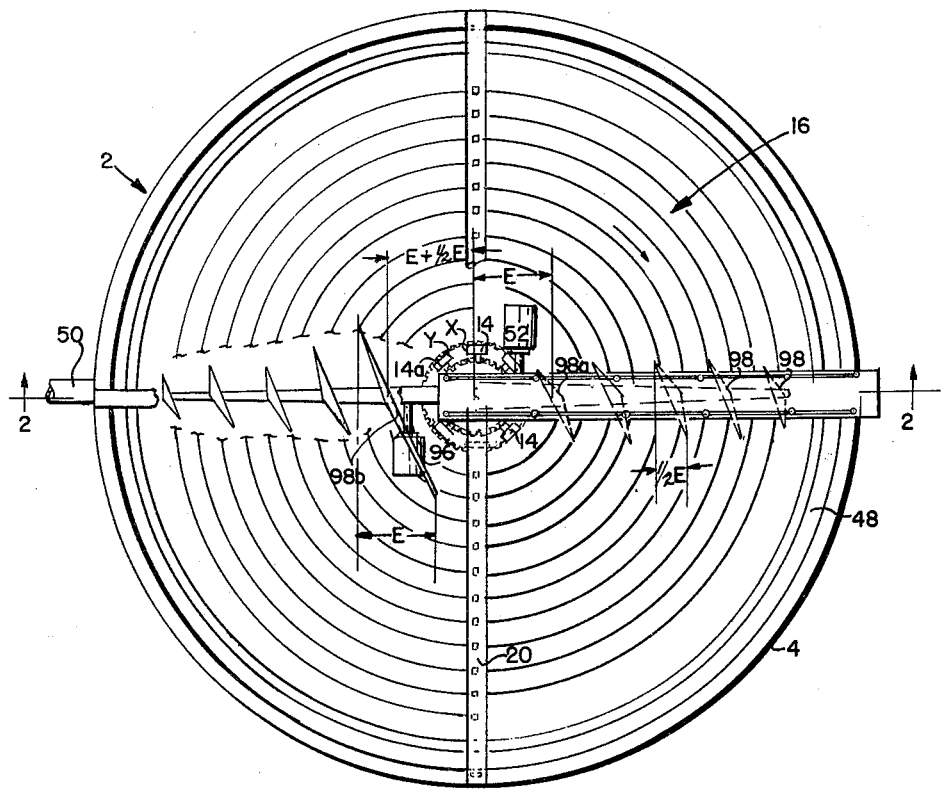
FIGURE 1 is a plan view of an improved settling tank constructed in accordance with the teachings of this invention.

The T distributors are obviously tubular structures, and they may have any diameter which seems suitable. They eliminate the need for the perforated inlet plates which are easily clogged. It should be understood that any number of inlet distributors may be used. Notwithstanding the fact that the inlet distributor arrangements shown in FIGURES 1 and 2 are preferable, any inlet distributing means may be used which insures substantial elimination of the energy of sewage introduced into the tank and which is not easily rendered inoperative by clogging.

Fluid which enters the tank through the distributors 14 assumes the non-turbulent laminar flow toward an overflow channel 48 disposed adjacent the inside circumference of side wall 4. Fluid reaching the overflow channel 48 is clear, for reasons which will become apparent hereinafter, and is drained off through a clear fluid outlet conduit 50.

As fluid passes from the inlet distributors 14 to the overflow channel 48, it travels over a spiral baffle 16 as shown in FIGURES 1 through 4. The spiral baffle 16 comprises a geometric spiral extending substantially over the inside of tank 2. It may be visualized as a sheet structure which has been wound into spiral form. It should be obvious from FIGURES 2 and 3 that the spiral extends down a substantial distance in the tank and that the faces 16(a), 16(b), 16(c), 16(d), etc., of the spiral form baffle surface on which particles traveling thereover may settle. Although the faces are referred to separately for purposes of explanation, it should be understood that they form one continuous spiral comprising a series of arcuite faces. It is important to note that the faces 16(a), 16(b), etc., slope away from the inlet distributors 14; that is, the top of the baffle faces are further away from the center of the tank than the bottom of the baffle faces. The angle of inclination of these baffles should be 20°, or less than the natural slope or angle of repose assumed by the granular or semi-fluid material settling out of the mixture and onto the inclined surfaces of the baffle. This angle is designated by the character α in FIGURE 2.

The angle of inclination of the baffles should be comparatively small, that is, less than 20° because for efficient operation the angle should be less than the angle of repose of the particles to be settled. It is difficult to specify the exact angle by formulation, and the important factor is that the baffles slope away from the inlet distributors.

Figure 8:
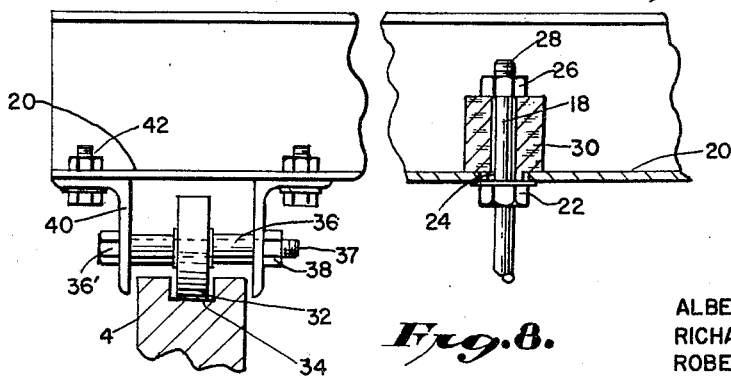
FIGURE 8 is a fragmental detailed view of a baffle frame supporting arrangement and coupling arrangement which may be used with settling tanks constructed under the teachings of this invention.

The spiral baffle 16 is supported within the tank 4 by means of a series of rods 18 which have bottoms that are suitable fixed to the tops of the baffle faces, as by a weld or the like. The rods 18 depend from a frame 20. As most clearly shown in FIGURE 8, the rods carry a nut 22 which normally abuts the bottom of the frame 20, and the rods extend through an aperture 24 in the frame. A resilient sleeve 30 surrounds the rods, and a nut 26 is carried at the top of the rod 18 and fixed thereto by means of threads 28. With this arrangement, the rod 18 may move vertically downward from the position shown since sleeve 30 can be compressed.

Depending from frame 20 at the circumference thereof are pairs of brackets 40 which carry a shaft 36 on which rotates wheel 32. The shaft 36 preferably has a head 36' abutting one bracket, and a thread extension 37 which carries a nut 38. Wheel 32 rests in a channel 34 which extends around the upper circumferential edge of side 4.

Since spiral baffle 16 is supported by rods 18, and since rods 18 depend from frame 20 which is rotatably mounted on the top of tank 2, the baffle 16 is rotatable within the tank. This is a very important feature of this invention because the rotating action increases the settling rate of particles dispersed in the incoming sewage.

Figure 5:
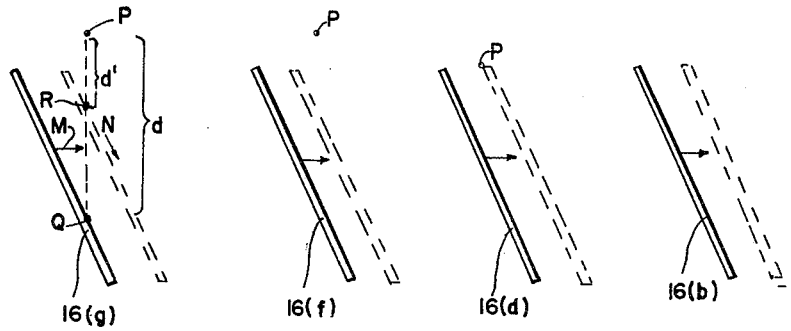
FIGURE 5 is a schematic diagram showing the path of travel of a particle to be settled in relation to the path of travel of a settling surface in a tank constructed under the teachings of this invention.

FIGURE 5 presents in schematic form successive positions of adjacent baffle faces. Face 16(g) is shown at a certain time which we will call time 1 in solid lines, and is shown at a later time, time 2, in dotted lines. In other words, the solid lines and dotted lines merely indicate two positions of the baffle faces.

Consider the particle P as a particle which is to be settled. If the baffle faces were stationary, particle P would have to travel a distance $d$ before reaching a settling surface. However, if the baffle is rotated in the direction of arrow M, then face 16(g) assumes the dotted line position since it is a face of a spiral, and particle P need only travel a distance $d'$ before settling. Thus, the distance which a particle must travel to settle is reduced over any such distance existent in a stationary baffle type settling tank.

In order to rotate the baffle 16, a variable speed motor 52 is provided as shown in FIGURES 1 through 4. The motor 52 has a shaft 54 which carries a worm gear 56 (FIGURE 4). Worm gear 56 cooperates with a circular rack gear 58 which is affixed to a shaft 60 attached to frame 20. Thus, when the variable speed motor 52 is energized, frame 20 rotates and baffle 16 is caused to rotate at various velocities.

It should be understood that the gear arrangement and motor drive shown, as well as the means for rotatably supporting the baffle may be constructed as shown in the drawings, or some other equally suitable arrangement may be used. The important factor is that the spiral baffle be rotatably supported and have faces sloping away from the inlet distributors 14.

Figures 6, 7:
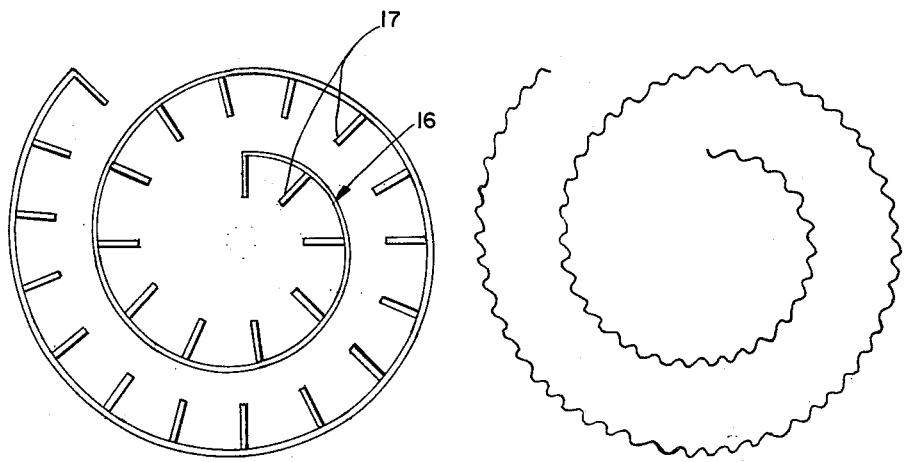
FIGURES 6 and 7 are schematic representations of modified forms of baffle structures provided by this invention.

In order to increase the settling surface area, the faces of the baffle may be modified as shown in FIGURES 6 and 7. In FIGURE 6, protrusions 17 have been affixed to the baffle faces, by weld or other suitable means, and in FIGURE 7 the baffle face has been shaped to provide alternate recesses and humps, or a wavy surface. As is appreciated by those of ordinary skill in the art, the settling is more efficient when the settling surface area is a maximum.

The direction of flow of liquid through the settling tank is shown by arrow B in FIGURE 2. The material settles out of the laminar flow at the top of the tank and on to the inclined baffle surfaces as explained above. Naturally the settling material carries with it a certain amount of liquid. As the settling material hits a baffle face it begins the glide down the baffle and the speed of the travel of the settled material down the baffle may be augmented by vibrating the baffles, therefore, a vibrating means 62 has been provided and affixed to bars 18 as shown in FIGURES 2 and 3.

After the particles to be settled have contacted a settling surface, namely the faces of baffle 16, they begin to slide down that surface toward the bottom of the tank. The slope of the baffles increases the settling capacity of the tank because with inclined baffle surfaces the thickness of the layer of settling solids on the baffle surface is at all times relatively thin. Of course, the vibration of the baffles by means of vibrating devices 62 augments the travel of settled particles down the baffle surfaces, and insures thin solids layers without collections of slime.

Since the solids layers are thin, liquid which is to be separated from the settled material need only pass through a thin layer of solids in order to become part of the circulating liquid traveling toward the overflow channel 48. It should be apparent that the depth of any solids layer should be thin so that the maximum number of surface pores are available for egress of the liquid which has been trapped in the solids layer.

By referring to FIGURE 2, it will be noted that in the tank there presented the inlet distributors 14 are disposed in substantially the same horizontal plane as the top of the baffle faces 16(a), 16(b), etc. With this arrangement a shallow laminar flow can be maintained over the top of the baffle surfaces and particles to be settled need travel only a comparatively small distance before contacting a settling surface. Although the baffle construction shown in FIGURE 2 is adequate for the intended purpose and a considerable improvement over any prior art arrangement, the preferred baffle structure is presented in FIGURE 3. By referring to that figure, it will be noted that the tops of successive baffle surfaces are progressively closer to the plane of the distributors 14 and the true overflow level 48' the nearer those baffle surfaces are to the side 4 of the tank. This arrangement of baffle surfaces provides for more uniform settling within the tank as will be appreciated if the relative areas covered by the laminar flow of fluid traveling from the inlet distributors 14 to the overflow channel 48 are considered.

As the laminar flow passes from the central area of the tank toward the outside, the area of free surface within the tank occupied by a given volume of liquid increases over the area occupied by the same volume near the center of the tank. Thus, a given volume of the laminar flow is spread thinner as it travels toward the overflow channel. This results in an increased velocity, and to settle the particles at the same rate at the outside as is achieved centrally, the tops of the baffles must be higher to accommodate the faster traveling shallower laminar flow. Of course, the higher baffles tend to slow down the flow so as to provide more uniform velocity in the tank.

The foregoing paragraphs of this description have considered, in some detail, the manner in which mixtures of liquid and suspended solids are introduced into the tank and the manner in which dispersed solids of the sewage are settled. However, of equal importance is the manner in which the settled particles are transferred to the sludge outlet chamber.

Particles which have settled onto the baffle faces and traveled down the same, drop off of those surfaces and travel to the bottom of the tank. In the foregoing description of settling, it should be remembered, there are roughly three zones of settling. The first zone is the free zone wherein the rotating inclined spiral baffles principally operate. This first free settling zone is followed by a transition zone wherein the settling particles start interfering with one another in their downward path. The final zone is usually referred to as the impeded settling zone wherein operates the secondary mechanical means for collecting the settled solid particles and sweeping them toward the sludge sump and outlet. As shown in FIGURES 2 and 3, the bottom 6 of the tank 2 is conical so that the particles may slide toward the center of the tank and into the sludge outlet channel 70. Although the conical configuration of the bottom wall aids in causing the settled solids to reach the sludge outlet channel, some mechanical means is needed to hasten such travel under normal conditions.

For this purpose, a scraper structure may be provided as shown in FIGURE 2 and designated generally by numeral 72. The scraper structure comprises a truss 74 which depends from a columnar frame 76 rotatably mounted via wheels 78 on ledge 80 of column 11. The columnar frame 76, as shown, has a member 82 which cooperates with the flange 84 on column 11 to hold the columnar frame 76 in place inside the innermost faces of the baffle 16.

The member 82 carries at its upper extremity a gear 90 as shown in FIGURE 3, and a worm gear 94, carried by shaft 92 of motor 96 cooperates with the gear 90 so that when variable speed motor 96 is energized, the columnar frame 76 and truss 74 carried thereby are rotated also at variable speed.

Depending from the bottom of truss 74 may be a series of shoes or blades 98 as shown in FIGURES 1 and 2. These blades 98 are disposed at an angle with respect to the truss so that their outermost tips point in the direction of rotation of the whole scraper structure 72. Because of the angled disposition of the blades 98, each blade moves a given volume of settled material closer to the center of the tank, and into the path of the next blade to traverse the area into which the preceding blade has moved that volume. FIGURE 1 shows the usual method of scraping deposits of settled solids from the periphery of settling tanks to the central discharge well. It should be apparent that all of the blades are located similarly to blades 98(a) and 98(b) so that the action of the scraper structure is continuous from the outside of the tank toward the center.

FIGURES 3 and 4 present a modified form of scraper blade which may be used instead of the series of blades shown in FIGURES 1 and 2. By referring to FIGURE 3, it will be seen that the truss 74 has been replaced by a circular frame extension 110 fixed to the bottom of the columnar frame 76. Attached to the frame extension 110 is a spiral scraper blade 112 (FIGURE 4) which has a sloping bottom surface 114 conforming to the slope of the bottom 6 of the tank. With this type of scraper arrangement, settled solids are gradually pushed toward the sludge outlet chamber 70 by the single blade 112. The moving of the settled solids toward the center takes place in one revolution whereas more than one revolution is required with the arrangement of FIGURES 1 and 2 in most all cases.

For convenience of inspection and repair, the invention also provides for a railed walkway 120 disposed above the tank. The walkway extends from one side of the tank to the center thereof. It is supported at the outside by a frame member 122 and centrally by a platform 124 carried on shaft 60. The platform may be mounted to revolve slowly with the baffle supporting frame 20 or mounted in a stationary position.

As should be apparent from the foregoing description of the invention, different types of frame structures, couplings, and the like may be used without departing from the scope and spirit of the invention. For example, the baffle supporting frame 20 has been shown as having two arms, but in some instances, it may be desirable to provide a four or more arm frame. The supporting rods 18 similarly may be of a different design than that shown on the rotatable mounting of the baffle structure or scraper structure may be changed within the skill of an ordinary mechanic familiar with the art.

No specific reference has been made in the preceding paragraphs to the upward flow of clear liquid along the underside of the baffles, however, it should be understood that the arrows F in FIGURES 2 and 3 designate the upward flow of liquid, and that the spiral baffle provided by this invention reduces any resistance to such flow since the undersides of the baffle faces are continually moving away from such flow. This is an important feature of this invention.

The term spiral baffle as used herein refers to a baffle structure circling continuously around a point or center of the tank in curves that constantly increase in size in a single plane. The spiral may be geometrically involute, a spiral of Archimedes, a hyperbolic spiral or even a logarithmic spiral.

The motors 52 and 96 which drive the baffle structure and scraper respectively should be variable in speed to allow for any necessary adjustment depending on the type of liquid solids mixture introduced into the tank. In some cases, as where the tank is used for settling well flocculated precipitates or precipitates of relatively high specific gravity, there may be no need to revolve the spiral at all.

Additionally, it should be understood that instead of using any scraper arrangement, or in conjunction with any scraper arrangement, revolving suction pipes may be used to collect and remove settled material from the bottom of the tank.

The method provided by the invention has been set forth in parts hereinabove. However, it should be apparent that the invention provides an improved method of settling solids comprising the steps of: Feeding mixtures composed of dispersed particles in a carrier liquid into a settling tank, directing the carrier liquid into separate streams entering the tank centrally in opposing relation whereby the carrier begins travel through the tank as a non-turbulent laminar flow, allowing the carrier to flow through the tank at a rate which permits the dispersed particles therein to settle therefrom, intercepting the particles as they settle from said carrier liquid on revolving settling surfaces, agitating the settling surfaces to hasten movement of the particles toward the bottom of the tank, the removing settled particles from said tank.

In the claims set forth below, certain terms have been used to broadly describe certain components of the invention. For example, the term "containing means" has been used to describe the structure formed by ring shape side wall 4 and bottom wall 6. Similarly, the vibrating device 62 has been referred to as means to agitate the baffles structure or means 16. Inlet well 90 has been termed as an isolated inlet well since it is isolated from the settling zone of the tank in which baffles 16 are disposed, except via inlet distributors 14.

After considering the foregoing description of the illustrative embodiments of the invention, objects of the invention and modifications of various components, other than those specifically set forth may become apparent to those or ordinary skill in the art. Accordingly, it is intended that this description be interpreted as illustrative and not in a limiting sense.

We claim:

1. A circular settling tank comprising containing means having a top and bottom, baffle means disposed within said containing means for receiving settled particles, said baffle means comprising a spiral baffle surface extending between the top and bottom of said containing means, said spiral baffle surface having a plurality of expanding and overlapping turns extending across a major portion of said containing means, means for introducing a carrier fluid with dispersed particles therein within said containing means for flow above said baffle means.

2. A settling tank as defined in claim 1 wherein said settling tank further includes means for rotating said baffle means.

3. A settling tank as defined in claim 2 wherein said containing means comprises a ring shape side wall joined to a conical bottom wall, wherein said means for introducing a carrier fluid within said spiral baffle surface has a top and bottom end, and wherein said containing means comprises a centrally disposed isolated inlet means and a series of distributing heads communicating with said inlet means and the area of said tank in which said spiral baffle surface is disposed, said distributing heads being disposed in substantially the same horizontal plane as the top of the outermost turn of said spiral baffle surface.

4. A settling tank as defined in claim 3 wherein said distributing heads comprise a series of conduits for directing said carrier liquid into separate streams entering the area of said containing means in which said spiral baffle surface is disposed in opposing relation whereby said carrier liquid assumes a non-turbulent laminar flow through said tank.

5. A settling tank as defined in claim 1 wherein said spiral baffle surface turns have top and bottom ends, and wherein said top ends of said spiral baffle surface turns are further from said means for introducing a carrier liquid into said containing means than the bottom ends thereof.

6. A settling tank as defined in claim 5 and further including means for rotatably mounting said baffle means and means for rotating said baffle means.

7. A settling tank comprising a circular containing means, a rotatably mounted baffle means disposed within said containing means for receiving settled particles, said baffle means comprising a spiral baffle surface extending vertically into said containing means, said spiral baffle surface having a plurality of expanding and overlapping turns extending across a major portion of said containing means, means for introducing a carrier liquid with dispersed particles therein into said containing means whereby said carrier liquid assumes a non-turbulent laminar flow above said baffle means, overflow means for draining said carrier liquid which has passed over said baffle means from said containing means, and means to remove settled particles from said containing means.

8. A settling tank as defined in claim 7 and further including means to agitate said baffle means.

9. A settling tank as defined in claim 7 and further including means for driving said rotatably mounted baffle means, wherein said spiral baffle surface turns are sloped vertically outward toward said overflow means.

10. A settling tank as defined in claim 7 wherein said containing means has a top and bottom end, wherein said spiral baffle surface turns have top and bottom ends, and wherein the top ends of said turns are progressively closer to the top end of said tank as the distance from the center of said tank to said spiral faces increases.

11. A settling tank as defined in claim 10 wherein the top ends of said spiral surface turns are further from the center of said containing means than the bottom ends of said spiral surface turns.

12. A settling tank as defined in claim 11 wherein said means for introducing a carrier liquid with dispersed particles therein into said containing means comprises a centrally disposed isolated inlet well, and a series of T-shape distributing heads communicating with said inlet well and the area of said containing means in which said baffle means is disposed.

13. A settling tank as defined in claim 7 and further including means to drive said rotatably mounted spiral baffle means.

14. A circular settling tank for clarifying liquids and thickening sludes settling from said liquids, said settling tank comprising a circular containing means having a concave conical bottom wall and a central column extending vertically upward from said bottom wall, an isolated hollow influent well means disposed near the top of said column, a plurality of fluid distributors communicating with said influent well means and the interior of said containing means, said distributors being disposed in a circular row above the vertical center of said containing means, a continuous inclined spiral baffle surface having a plurality of expanding and overlapping turns disposed around said column within said containing means whereby liquids entering said containing means through said distributors flow over said baffle means so that settleable solids carried by said liquids settle on the baffle surfaces of said baffle means and slide down the surfaces of said baffle means and drop on the bottom wall of said containing means, sludge outlet means disposed centrally of the bottom wall of said containing means, and means for causing said settled solids to travel to said sludge outlet means.

15. A circular settling tank as defined in claim 13 wherein said baffle means is rotatably mounted and wherein said tank further includes means for driving said baffle means whereby said baffle surfaces continuously intercept sludge settling from said liquids.

16. A settling tank comprising containing means having a top and bottom, baffle means rotatably disposed within said containing means for receiving settled particles, said baffle means comprising a spiral baffle surface extending between the top and bottom of said containing means, said spiral baffle surface having a plurality of expanding and overlapping turns extending across a major portion of said containing means, means for introducing a carrier fluid with dispersed particles therein within said containing means for flow above said baffle means, means rotatably disposed within said containing means adjacent the bottom thereof for removing settled particles therefrom, the speed of rotation of said latter mentioned means being relatively variable with respect to the rotational speed of said spiral baffle means.

17. A method of settling solids comprising the steps of feeding a carrier liquid having dispersed solid particles therein into a settling tank adjacent the top thereof, directing said carrier liquid into a plurality of pairs of separate streams, each of said pairs of streams entering said tank in a confined region in opposed relation and contacting each other to substantially cancel the inlet velocities thereof, whereby the carrier liquid assumes a substantially laminar flow and forms a non-turbulent layer outside said confined region free to settle downwardly in said settling tank, allowing the carrier liquid to flow downwardly through a substantial height of the tank from said layer through concentric passages, and intercepting the particles during such extended downward movement as they settle from the carrier liquid by said passage walls which are vertically inclined with respect to the side wall of the settling tank so that the solid particles collect on said inclined surfaces and their downward movement is thereby accelerated to the bottom of the tank.

References Cited in the file of this patent

UNITED STATES PATENTS

| | | |
|---|---|---|
| 1,135,997 | Dorr | Apr. 20, 1915 |
| 1,177,849 | De Kalb | Apr. 4, 1916 |
| 1,551,689 | Petree | Sept. 1, 1925 |
| 1,605,596 | Langelier | Nov. 2, 1926 |
| 2,205,199 | Hubbell et al. | June 18, 1940 |
| 2,263,168 | Dorr et al. | Nov. 18, 1941 |
| 2,313,896 | Scheble | Mar. 16, 1943 |
| 2,498,292 | Naugle | Feb. 21, 1950 |
| 2,678,730 | Coulter | May 18, 1954 |
| 2,702,124 | Stengel | Feb. 15, 1955 |
| 2,894,637 | Schreiber | July 14, 1959 |

FOREIGN PATENTS

| | | |
|---|---|---|
| 227,357 | Switzerland | Aug. 16, 1943 |
| 719,183 | Germany | Mar. 31, 1942 |